(12) United States Patent
Myeong et al.

(10) Patent No.: US 8,712,588 B2
(45) Date of Patent: Apr. 29, 2014

(54) METHOD AND/OR APPARATUS FOR NAVIGATING MOBILE ROBOT USING VIRTUAL SENSOR

(75) Inventors: Hyeon Myeong, Suwon-si (KR); Youngjin Hong, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 407 days.

(21) Appl. No.: 11/060,494

(22) Filed: Feb. 18, 2005

(65) Prior Publication Data
US 2005/0187678 A1    Aug. 25, 2005

(30) Foreign Application Priority Data

Feb. 19, 2004    (KR) .................. 10-2004-0011013

(51) Int. Cl.
*G05B 15/00*    (2006.01)

(52) U.S. Cl.
USPC ............... 700/258; 700/255; 701/23; 901/46

(58) Field of Classification Search
USPC ............ 318/568.16, 587; 700/245, 251, 252, 700/255, 258; 701/22–25, 27, 32, 34, 40, 701/57, 207–208, 29; 901/46, 47
See application file for complete search history.

(56) References Cited

U.S. PATENT DOCUMENTS

| | | | | |
|---|---|---|---|---|
| 5,124,918 A | * | 6/1992 | Beer et al. | 701/27 |
| 5,309,212 A | | 5/1994 | Clark | |
| 5,341,459 A | * | 8/1994 | Backes | 700/260 |
| 5,400,244 A | * | 3/1995 | Watanabe et al. | 701/28 |
| 5,525,882 A | * | 6/1996 | Asaka et al. | 318/568.16 |
| 5,545,960 A | * | 8/1996 | Ishikawa | 318/587 |
| 5,758,298 A | * | 5/1998 | Guldner | 701/23 |
| 2005/0049788 A1 | * | 3/2005 | Haider | 701/301 |
| 2006/0064202 A1 | * | 3/2006 | Gutmann et al. | 700/245 |

FOREIGN PATENT DOCUMENTS

| | | |
|---|---|---|
| JP | 2002-215238 | 7/2002 |
| KR | 1995-0012987 | 10/1995 |

OTHER PUBLICATIONS

Dima et al, Sensor and Classifier Fusion for Outdoor Obstacle Detection: an Application of Data Fusion To Autonomous Off-Road Navigation, 2003, IEEE Computer Society, Proceedings of the 32nd Applied Imagery Pattern Recognition Workshop (AIPR'03).*
Simmons et al, "Probabilistic Robot Navigation in Partially Observable Environments," Jul. 1995, Proceedings of the International Joint Conference on Artificial Intelligence, pp. 1080-1087.*
Pauly et al, "Real-Time Object Detection for Autonomous Robots," 1998, Autonome Mobile Systeme.*
Elfes, "Using Occupancy Grids for Mobile Robot Perception and Navigation," Jun. 1989, Carnegie Mellon University.*

(Continued)

*Primary Examiner* — Khoi Tran
*Assistant Examiner* — Spencer Patton
(74) *Attorney, Agent, or Firm* — Staas & Halsey LLP

(57) ABSTRACT

A method and apparatus of improving the navigation performance of robot are provided. The navigation method using a virtual sensor includes: generating information on positions of obstacles, the information which is estimated to be generated by virtual sensors that are virtually present, based on information on positions of the obstacles, which is generated by physical sensors; and controlling a movement of a robot according to the information on the positions of the obstacles. It is possible to overcome limits in the number and arrangement of previously installed physical sensors.

8 Claims, 9 Drawing Sheets

(56) References Cited

OTHER PUBLICATIONS

Kirman, et al., "Sensor Abstractions for Control of Navigation," Apr. 1991, International Conference on Robotics and Automation, Department of Computer Science, Brown University.*

J. Borenstein et al., "Real-time Obstacle Avoidance for Fast Mobile Robots in Cluttered Environments", Reprint of the Proceedings of the 1990 IEEE International Conference on Robotics and Automation, May 1990, pp. 572-577.

* cited by examiner

FIG. 5

```
for(G_x, G_y within Maximum Range){
    if(grid[g_x][g_y] ≥ Threshold){
```
$$SensorID = \text{int} \left(\frac{N_{rs}}{2} + (\alpha - \theta) \cdot \frac{N_{rs}}{\pi}\right)$$
$$range = \sqrt{(G_x - R_x)^2 + (G_y - R_y)^2} \cdot meter/grid$$
```
        if (range < Range[SensorID])
            then Range[SensorID] = range
    }
}
```

METHOD AND/OR APPARATUS FOR NAVIGATING MOBILE ROBOT USING VIRTUAL SENSOR

CROSS-REFERENCE TO RELATED APPLICATION

This application claims the benefit of Korean Patent Application No. 10-2004-0011013, filed on Feb. 19, 2004, in the Korean Intellectual Property Office, the disclosure of which is incorporated herein in its entirety by reference.

BACKGROUND OF THE INVENTION

1. Field of the Invention

The present invention relates to a method and/or apparatus for improving a navigation performance of a robot, and more particularly, to a sensor which is used to detect obstacles.

2. Description of the Related Art

Various kinds of methods are used for robot navigation.

Map-based navigation methods, such as a vector field histogram (VFH) ("Real-time obstacle avoidance for fast mobile robots in cluttered environments", IEEE International Conference on Robotics and Automation, vol. 1, pp. 572-577, 1990) and U.S. Pat. No. 5,006,988 entitled "Obstacle avoiding navigation system", construct the presence and absence of obstacles using histogram according to angles. Since information on real distance to the obstacles is not contained, it is possible to avoid the obstacle, however, hard to navigate the robot to move close to the obstacles.

Sensor-based navigation methods, such as Bug, Bug2, DistBug and VisBug, have disadvantages in that they cannot detect obstacles that are disposed in directions in which sensors are not installed. In other words, in order to correctly detect positions of the obstacles, a large number of sensors are required.

In order to solve these problems, rotary sensor based navigation methods, such as U.S. Pat. No. 5,309,212 entitled "Scanning rangefinder with range to frequency conversion" and Japanese Patent No. 2002-215238 entitled "Obstacle detecting sensor of automatic guided vehicle", rotate sensors or additional devices (mirrors, prisms, etc.), which are attached to the sensors, in order to decrease the number of sensors, thus obtaining the same effect as the case when a large number of sensors are installed. However, due to the rotation of the sensors, delay time occurs and it is necessary to design a complex apparatus such as mirror/prism rotating devices.

SUMMARY OF THE INVENTION

Additional aspects and/or advantages of the invention will be set forth in part in the description which follows and, in part, will be obvious from the description, or may be learned by practice of the invention.

According to an aspect of the present invention, a navigation method and apparatus that can overcome limitations in the number and arrangement of previously installed physical sensors by controlling a movement of a robot based on virtual sensors that are virtually present.

According to an aspect of the present invention, a navigation method using a virtual sensor includes: generating information data about positions of obstacles, the information, which is estimated to be generated by virtual sensors that are virtually present, based on information on positions of the obstacles, which is generated by physical sensors; and controlling a movement of a robot according to the information on the positions of the obstacles.

According to another aspect of the present invention, a navigation apparatus using a virtual sensor includes: a virtual sensor information generating part which generates information data on positions of obstacles, the information, which is estimated to be generated by virtual sensors that are virtually present, based on information on positions of the obstacles, which is generated by physical sensors; and a control part which controls a movement of a robot according to the information on the positions of the obstacles.

According to a further another aspect of the present invention, there is provided a computer-readable recording medium encoded with processing instructions for implementing a navigation method using a virtual sensor, in which the method includes: generating information on positions of obstacles, the information, which is estimated to be generated by virtual sensors that are virtually present, based on information on positions of the obstacles, which is generated by physical sensors; and controlling a movement of a robot according to the information on the positions of the obstacles.

BRIEF DESCRIPTION OF THE DRAWINGS

These and/or other aspects and advantages of the invention will become apparent and more readily appreciated from the following description of the embodiments, taken in conjunction with the accompanying drawings of which:

FIG. 5 illustrates a virtual sensor information production program that is used in a robot according to an embodiment of the present invention;

DETAILED DESCRIPTION OF THE PREFERRED EMBODIMENTS

Figure 1:
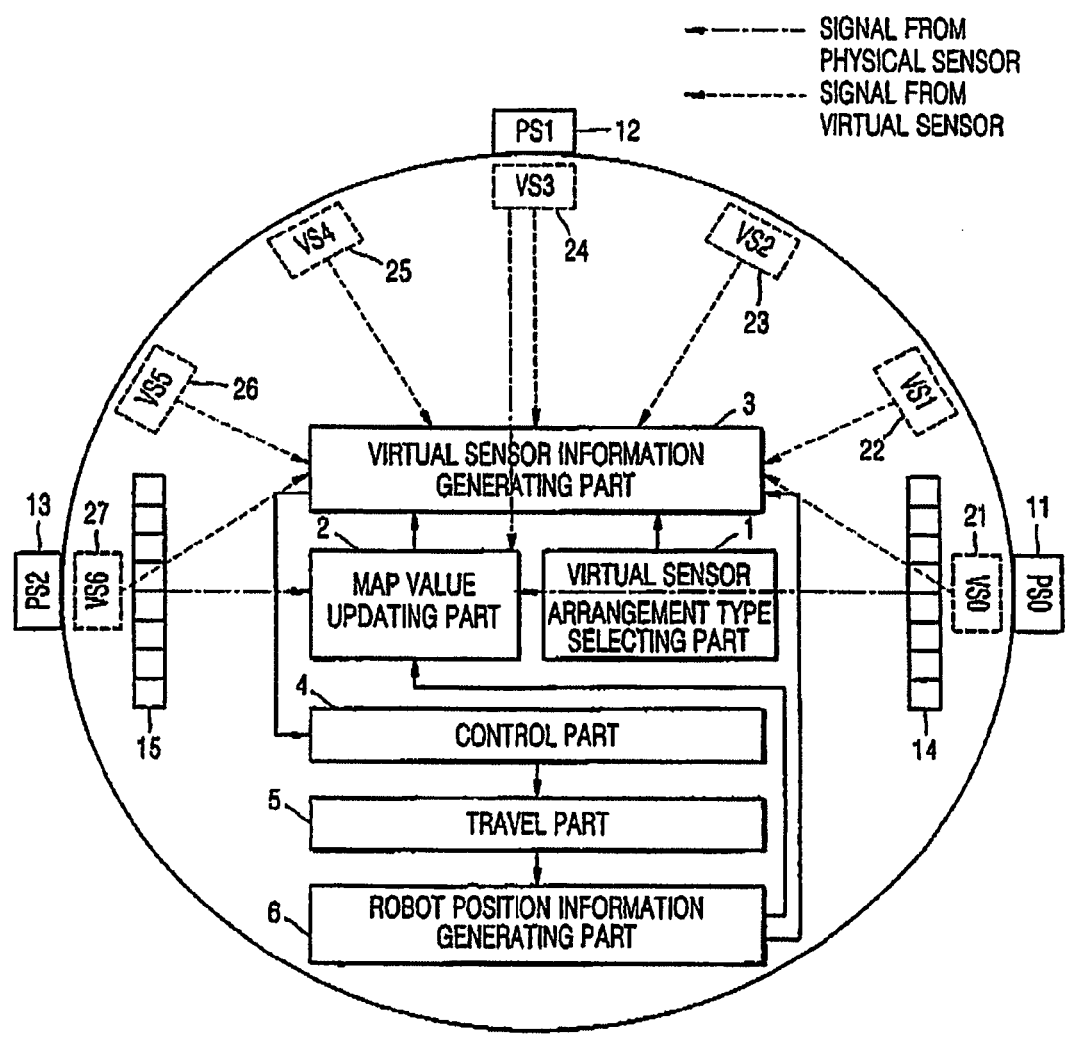
FIG. 1 illustrates a construction of a robot according to an embodiment of the present invention.

The present invention will now be described more fully with reference to the accompanying drawings, in which exemplary embodiments of the invention are shown. The invention may, however, be embodied in many different forms and should not be construed as being limited to the embodiments set forth herein; rather, these embodiments are provided so that this disclosure will be thorough and complete, and will fully convey the concept of the invention to those skilled in the art. In the drawings, the thickness of layers and regions are exaggerated for clarity. Like reference numerals in the drawings denote like elements, and thus their description will be omitted.

FIG. 1 illustrates a construction of a robot according to an embodiment of the present invention.

Referring to FIG. 1, a robot includes three physical sensors 11 to 13, two wheels 14 and 15, a virtual sensor arrangement type selecting part 1, a map value updating part 2, a virtual sensor information generating part 3, a control part 4, a motion part 5, and a robot position information generating part 6.

The physical sensors (PS0, PS1 and PS2) 11, 12 and 13 detect obstacles existing within detectable ranges and generate information on the positions of the detected obstacles. Ultrasonic sensors, infrared sensors, laser sensors and so on are used as the physical sensors.

An operation of the ultrasonic sensor, which is widely used, will now be described. The ultrasonic sensor transmits ultrasonic waves in a forward direction. When an obstacle is present in the path of an ultrasonic wave, the ultrasonic wave is reflected by the obstacle and the ultrasonic sensor receives the reflected ultrasonic wave. At this time, the distance between the robot and the obstacle can be measured using the speed of the ultrasonic wave and the difference between the transmission time and reception time. Also, since the direction of the ultrasonic sensor is that of the obstacle, the position of the obstacle can be determined. An operation principle of the other sensors is similar to that of the ultrasonic sensor.

The virtual sensor arrangement type selecting part 1 selects one of the sensor arrangement types stored in a sensor arrangement type database.

Figure 2:
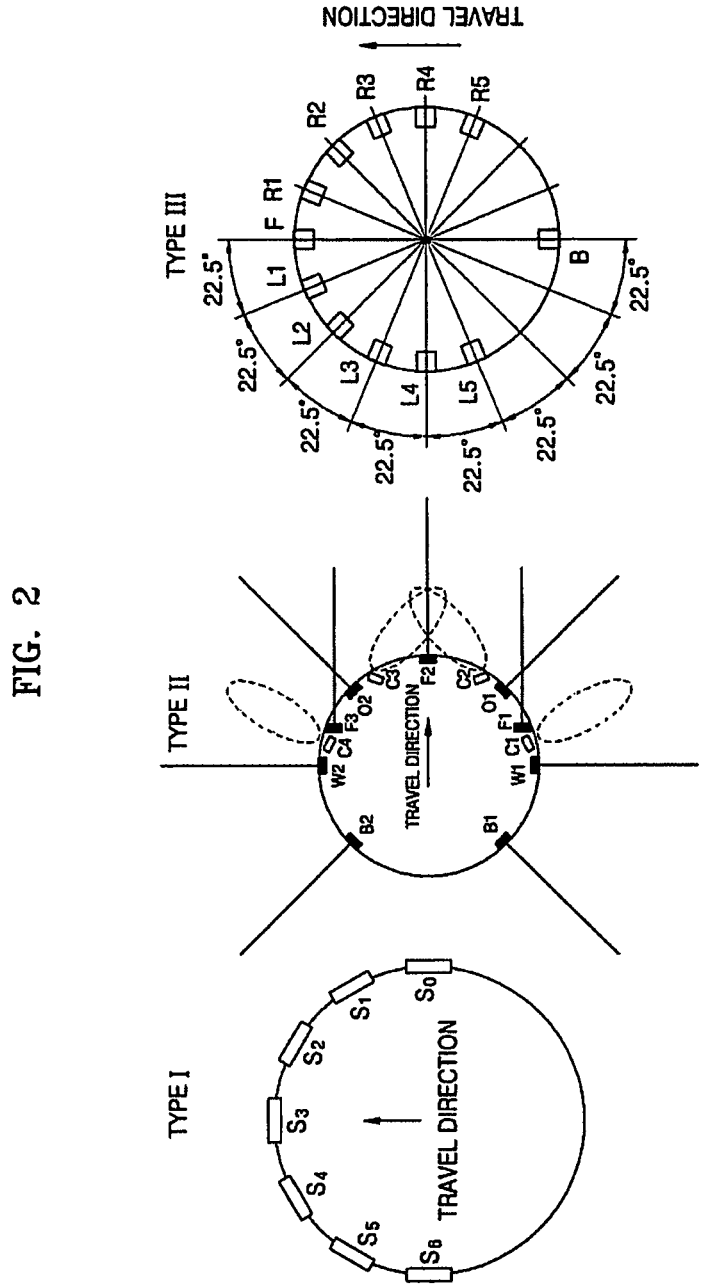
FIG. 2 illustrates arrangement types of sensors that are used in a robot according to an embodiment of the present invention.

FIG. 2 illustrates the arrangement types of sensors that are used in the robot according to an embodiment of the present invention.

Referring to FIG. 2, the arrangement types of the sensors includes type I, type II and type III.

For type I, a total of seven sensors are arranged at 0°, 30°, 60°, 90°, 120°, 150°, and 180°, respectively. Since the sensors are arranged regularly, it is easy to control a movement of the robot using position information of the obstacles, which are generated from the sensors. However, type I sensors cannot detect the obstacles more accurately than type II or type III, which will be described below.

As shown in FIG. 2, in case of type II and type III, the sensors are arranged complexly. In type II sensor arrangement, reference symbols C1 to C4 denote contact sensors, F1 to F3 front sensors, O1 to O2 oblique sensors, W1 and W2 wall sensors, and B1 and B2 back sensors, respectively. In the type III sensor arrangement, reference symbols L1 to L5 denote left sensors, R1 to R5 right sensors, F a front sensor, and B a back sensor, respectively. Since the sensors of type II and type III are arranged irregularly, it is possible to detect the obstacles more accurately using the information on positions of the obstacles, but it is hard to control the movement of the robot compared to type I.

Accordingly, designers who design robots need to select a proper type, considering a performance required of the robot and their design capability. According to an embodiment of the present invention, although type I is selected for fully understanding and easy explanation, the cases of type II and type III can also be designed with the same principle. Of course, other types of arrangements may be designed according to a user taste or purpose in order to enhance a performance of a robot.

Referring again to FIG. 1, according to the information on the positions of the obstacles, which is generated from the PS0 11, PS1 12 and PS2 13, the map value updating part 2 updates presence probability values of the obstacles, which are recorded in cells of a map representing the movement area of the robot. According to an embodiment of the present invention, the cells which have probability values that are updated will correspond to cells which are present within the detectable regions (or regions in which a sensor can detect an object) of actual sensors. Because robot system designers or users can freely set the detectable regions of the virtual sensors within the detectable regions of the actual sensors, the robot can be made to move while maintaining a constant distance from the obstacles. In other words, if the obstacle is present in the detectable region of the virtual sensor, the robot avoids the obstacle. As a result, the robot moves along the obstacle, while being spaced away from it by a distance corresponding to the detectable region.

Figure 3:
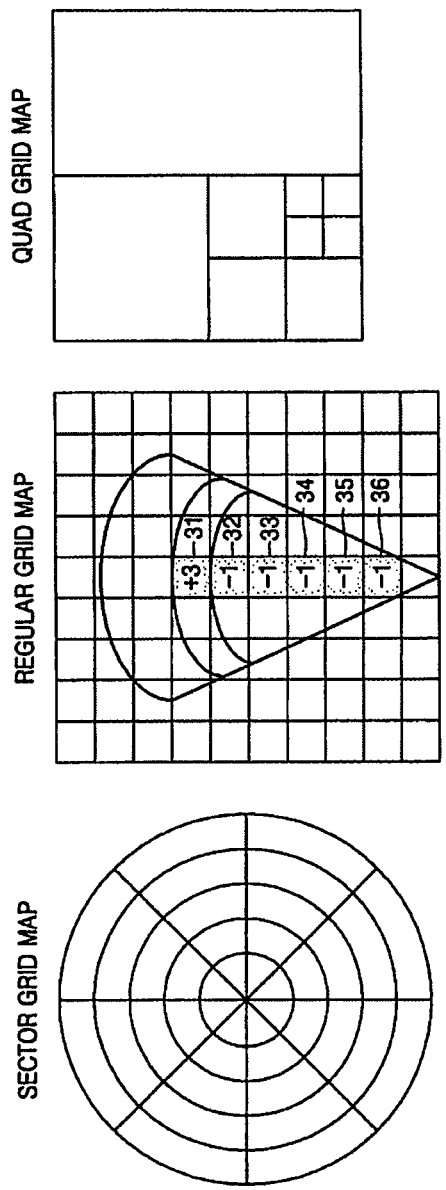
FIG. 3 illustrates various kinds of grid maps that are used in a robot according to an embodiment of the present invention.

FIG. 3 illustrates various kinds of grid maps that are used in the robot according to an embodiment of the present invention.

Referring to FIG. 3, the grid maps include a sector grid map, a regular grip map, and a quad grid map. The sector grid map is divided into sector-shaped cells, and the regular grid map is divided into equal-sized rectangular cells. The quad grid map is divided into rectangular cells of various areas. The presence probability values of the obstacle are recorded in the respective cells.

A principle of the map-based navigation method will now be described using the regular grid map, which is widely used. A detectable region of the ultrasonic sensor is illustrated on the regular grid map. Due to the characteristic of the ultrasonic wave, the detectable region is shown with a cone shape. If the obstacle is present around a region including a cell 31 among the cone-shaped region, the ultrasonic sensor receives a reflected signal. It is detected or determined that the obstacle is present in all the adjacent cells. Accordingly, information on an accurate position of the obstacle cannot be generated through a one-time measurement only. Considering the movement of the robot, the position of the obstacle is measured at several positions and several times. The measured values are reflected on the probability values of the cells, thus generating information on a more accurate position of the obstacle.

According to an embodiment of the present invention, the map is updated using an equation below:

$$\text{grid}(Gx,Gy)=\text{grid}(Gx,Gy)+I \quad \text{(Eq. 1)}$$

where grid(Gx,Gy) represents a probability value of a cell that is present at a coordinate (Gx,Gy), and I represents an increment or decrement of the probability value. Although a general probability value is represented by an actual number in the range of 0 to 1, the probability value of Eq. 1 will be represented by an integer between 0 and 15 for convenience sake. If the probability value of Eq. 1 is smaller than 0, it is represented as 0. If the probability value of Eq. 1 is greater than 15, it is represented as 15. For example, if the obstacle is present within the cell, I=3, and if no obstacle is present within the cell, I=−1. All the probability values are set to 0 when the map is initially established, and the probability value of the map is updated while the robot is moving. Based on the probability value of the current map, the robot avoids the cells in which probability values higher than a threshold value are recorded.

If the ultrasonic sensor receives the reflected signal of the shown regions (FIG. 3), "3" is added to or set in the probability value of the cell 31 and "−1" is added to the probability values of the cells 32 to 36 disposed between the robot and the cell 31. Since no obstacle is present between the robot and the cell 31, the signal that is reflected from the cell 31 can be received through the ultrasonic sensor. For this reason, "−1" is added to the probability values of the cells 32 to 36.

Referring again to FIG. 1, based on the information on the positions of the obstacles, which are generated at the physical sensors (PS0, PS1 and PS2) 11, 12 and 13, the virtual sensor information generating part 3 generates information on the positions of the obstacles, which is estimated to be generated by the virtual sensors (VS0 to VS5) 22 to 26. Here, the virtual sensors are virtually present at positions determined according to type I, which is selected by the virtual sensor arrangement type selecting part 1. In other words, assuming that the physical sensors are present at the positions determined according to type I, the virtual sensor information generating part 3 generates the information on the positions of the obstacles, which is estimated to be generated by the virtual sensors corresponding to the physical sensors present at the positions determined according to type I, using the information on the positions of the obstacles, which is really generated by the physical sensors (PS0, PS1 and PS2) 11, 12 and 13. In this embodiment, the virtual sensor information generating part 3 generates information on the distance, which is estimated to be generated by the virtual sensors, using difference between the information on the positions of the obstacles, which are present at the direction angles of the virtual sensors (that is, 0°, 30°, 60°, 90°, 120°, 150° and 180°), and the information on the current position of the robot, which is estimated to be generated by the robot position information generating part 6. The information on the positions of the obstacles, which is generated by the physical sensors, is an information on distances to the obstacles, which can be measured using the speed of the ultrasonic wave and the difference between the transmission time and reception time of the ultrasonic wave. Only with the information on the positions of the obstacles, which are present at the direction angles of the virtual sensors, that is, 0°, 30°, 60°, 90°, 120°, 150° and 180°, the distances between the obstacles and the robot can be calculated using the difference between the information on the current positions of the obstacles and the information on the current position of the robot. In this manner, it is possible to generate the information on the distances, which is estimated to be generated by the virtual sensors.

According to an aspect of this invention, the map may be used to store the information on the positions of the obstacles, which is generated by the physical sensors (PS0, PS1 and PS2) 11, 12 and 13. In other words, the virtual sensor information generating part 3 generates the information on the distances between the obstacles and the robot, the information, which is estimated to be generated by the virtual sensors (VS0 to VS6) 21 to 27, using the difference between the information on the positions of the cells having probability values greater than a threshold value among the cells having the updated probability values and the information on the current position of the robot. Here, the information on the positions of the cells having probability values greater than the threshold value corresponds to the information on the positions of the obstacles. In the above example, the threshold value may be set to 4. The cells having the probability values greater than 4 are considered as the presence of the obstacles. In other words, the virtual sensor information generating part 3 generates the information on the distances between the obstacles and the robot, the information, which is estimated to be generated by the virtual sensors (VS0 to VS6) 21 to 27, using the difference between the information on the positions of the cells having probability values greater than 4 and the information on the current position of the robot.

Figure 4:
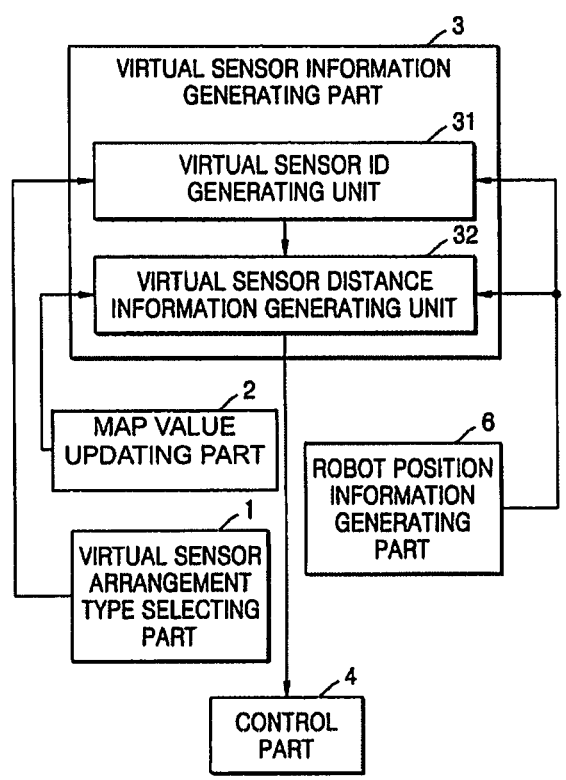
FIG. 4 illustrates a construction of the virtual sensor information generating part of FIG. 1.

FIG. 4 illustrates a construction of the virtual sensor information generating part of FIG. 1 according to an aspect of the present invention.

Referring to FIG. 4, the virtual sensor information generating part 3 includes a virtual sensor ID generating unit 31 and a virtual sensor distance generating unit 32.

The virtual sensor ID generating unit 31 generates IDs of the virtual sensors, based on the direction angles of the virtual sensors, which are virtually present at the positions determined according to the sensor arrangement type selected by the virtual sensor arrangement type selecting part 1, and the current direction angle of the robot, which is generated by the robot position information generating part 6. The virtual sensors are virtually present and need to be distinguished therefrom. The virtual sensor ID generating unit 31 functions to assign the IDs to the virtual sensors in order to distinguish them from each other. According to the present invention, the virtual sensor ID generating part 31 generates the IDs of the virtual sensors from the difference between the direction angles of the positions determined according to the type I (that is, 0°, 30°, 60°, 90°, 120°, 150° and 180°) and the current direction angle of the robot, using an equation below:

$$SensorID = \text{int}\left(\frac{N_{VS}}{2} + (\alpha - \theta) \cdot \frac{N_{VS}}{\pi}\right) \quad \text{(Eq. 2)}$$

where,
int( ): a function of truncating a real value to its integer value
Nvs: denotes the number of virtual sensors
α: the direction angles of cells
θ: the current direction angle of the robot An absolute value of (α−θ) will be equal to or less than π and SensorID will be a value ranging from 0 to (Nvs−1). In this embodiment, Nvs is 7. Therefore, if Nvs is substituted into the equation 2, the IDs of the virtual sensors (VS0 to VS6) 21 to 27 respectively become 0, 1, 2, 3, 4, 5 and 6 regardless of the movement direction of the robot.

The virtual sensor distance generating unit 32 generates the information on the distances between the obstacles and the robot, the information, which is estimated to be generated by the virtual sensors having the IDs generated from the virtual sensor ID generating unit 31, using the difference between the information on the positions of the obstacles, which are present at the direction angles of the virtual sensors, and the information on the current position of the robot, which is generated from the robot position information generating part 6. Here, the information on the positions of the obstacles is generated from the physical sensors (PS0, PS1 and PS2) 11, 12 and 13. In this embodiment, using an equation below, the virtual sensor distance generating unit 32 generates information on the distances between the obstacles and the robot, the information, which is estimated to be generated by the virtual sensors having the IDs generated from the virtual sensor ID generating unit 31, using the difference between the information on the positions of cells having probability values greater than 4 among the cells having the updated probability values and the information on the current position of the robot.

$$\text{range}[SensorID] = \sqrt{(G_X - R_X)^2 + (G_Y - R_Y)^2} \quad \text{(Eq. 3)}$$

where (Gx,Gy) is the information on the positions of the cells having the probability values greater than the threshold value of 4, and (Rx,Ry) is information on the current position of the robot. The cells having probability values greater than the threshold value of 4 and the distance values of the robot are calculated. The calculated values are the information data about the distances between the obstacles and the robot.

FIG. 5 illustrates a program that is used in the robot according to an embodiment of the present invention.

Referring to FIG. 5, according to "for(Gx,Gy within maximum range){ }", { } is performed to all the cells that are present within a maximum range. Here, the maximum range corresponds to the detectable range of the virtual sensor. As described above, the robot system designers or users can freely set the detectable regions. Therefore, the robot can be made to move while maintaining the specified range from the obstacles. In case the present invention is applied to a cleaner robot or the like, the maximum range has only to be set properly depending on the use environment.

Then, according to "if (grid[Gx][Gy]≥Threshold){ }", { } is performed only when the probability value of the cell is equal to or greater than 4. Thereafter, according to $$SensorID = int\left(\frac{N_{VS}}{2} + (\alpha - \theta) \cdot \frac{N_{VS}}{\pi}\right) \text{ and}$$

range[SensorID]=$\sqrt{(G_X-R_X)^2+(G_Y-R_Y)^2}$·meter/grid, the IDs of the virtual sensors and the distances between the cells and the robot are calculated. Then, according to "if (range<range (SensorID)) then range[SensorID]=range", in case there are a plurality of cells having the probability values greater than 4 with respect to the same virtual sensors, that is, the same direction angles, the distance between the robot and the cell disposed closest to the robot becomes the information on the distance between the obstacles and the robot, which is estimated to be generated by the virtual sensor. In case the obstacle is present over the several cells, the position of the cell closest to the robot corresponds to an edge of the obstacle.

Figure 6:
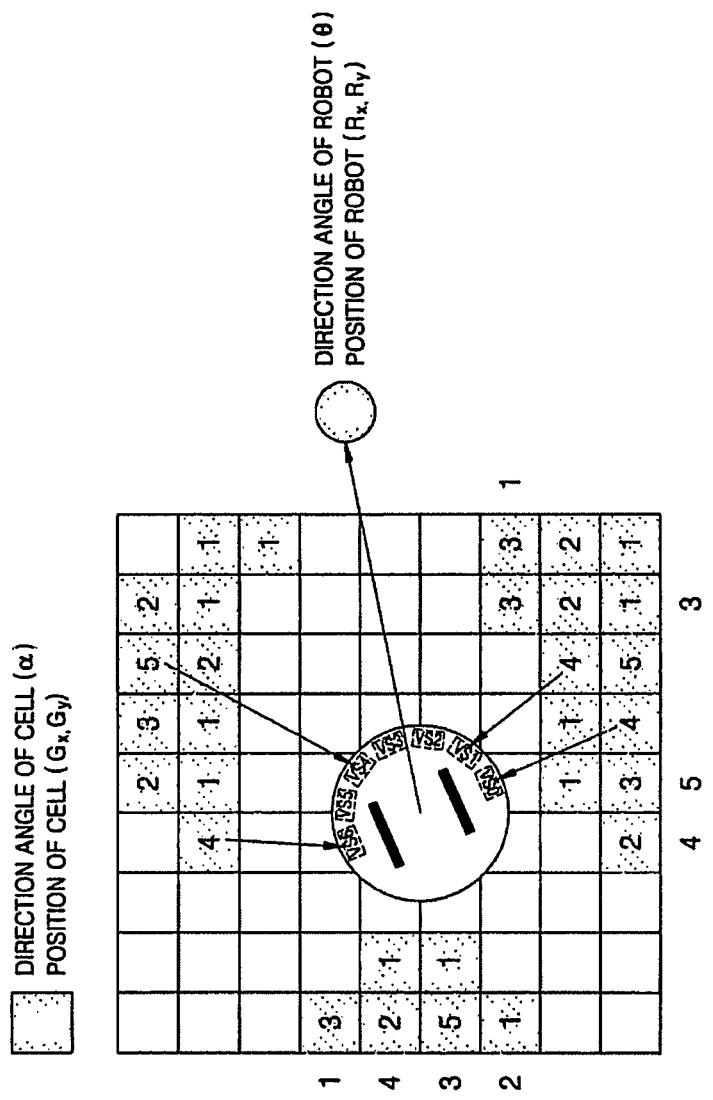
FIG. 6 illustrates an exemplary operation of a robot according to an embodiment of the present invention.

FIG. 6 illustrates an exemplary operation of the robot according to an embodiment of the present invention.

Referring to FIG. 6, various probability values are recorded on the respective cells of the map. In FIG. 6, there are shown the detectable regions of the virtual sensors on the whole map. In case the threshold value is 4, the presence of the obstacle can be detected by the VS0 21, the VS1 22, VS4 25 and VS6 27, which are respectively positioned at 0°, 30°, 120° and 180°. The virtual sensor (if the virtual sensors are real) may generate the information on the distances between the obstacles and the robot. In other words, using the program of an aspect the present invention, it is possible to generate the information on the distances between the obstacles and the robot, which is estimated to be generated by the virtual sensors having the individual IDs.

Referring again to FIG. 1, the control part 4 controls the movement of the robot according to the information on the positions of the obstacles, which is generated from the virtual sensor information generating part 3. Although the virtual sensors are not present physically, the control part 4 can perform a control based on many sensors, since the information equal to the information on the positions of the obstacles, which is generated from the physical sensors, is inputted to the control part 4. In other words, the control part 4 can control the movement of the robot using each of a fuzzy rule-based control method, a neural network-based control method, a proportional integral derivative (PID) control method, and other methods which correspond to the sensor-based control method, or a combination thereof. The motion part 5 adjusts the rotation speeds of two drive devices (for example, two motors), which drive the two wheels 14 and 15, under a control of the control part 4, thereby making the robot move in the corresponding moving direction and at the corresponding moving speed.

The robot position information generating part 6 generates the information on the current position of the robot using an encoder, which can measure the number of rotations of the two wheels 14 and 15. The information on the current position of the robot, which is generated from the robot position information generating part 6, is fed back to the map value updating part 2 and the virtual sensor information generating part 3.

Figure 7:
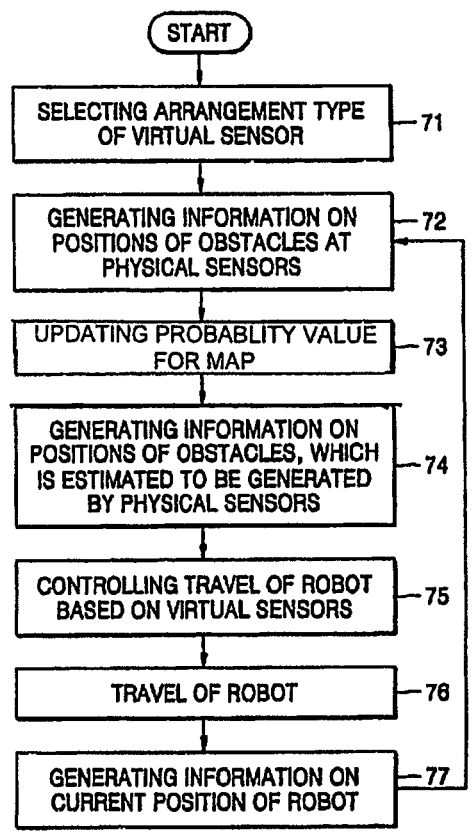
FIG. 7 is a flowchart illustrating a navigation method using a virtual sensor according to an embodiment of the present invention.

FIG. 7 is a flowchart illustrating a navigation method using the virtual sensors according to an embodiment of the present invention.

The navigation method using the virtual sensors, which will be described below, is performed in the robot of FIG. 1 and all the above-described contents are also applied to the navigation method.

Referring to FIG. 7, a predetermined sensor arrangement type may be selected by a robot system designer or user (operation 71). Information on the positions of obstacles is generated from physical sensors (operation 72). Probability values recorded on the cells for the map are updated according to the information on the positions of the obstacles, which is generated from the physical sensors (operation 73).

Then, information on the positions of the obstacles, which is estimated to be generated by the virtual sensors, is generated based on the information on the positions of the obstacles (operation 74). Here, the virtual sensors are virtually present at the positions determined according to the selected sensor arrangement type. In other words, the information on the distances between the obstacles and the robot, the information, which is estimated to be generated by the virtual sensors, is generated using the difference between the information on the positions of the obstacles, which are present in the direction angles of the virtual sensors, and the information on the current position of the robot. The operation 74 includes the following procedures. The IDs of the virtual sensors are generated based on the direction angles of the virtual sensors and the current direction angle of the robot. Then, the information on the distances between the obstacles and the robot, the information, which is estimated to be generated from the virtual sensors having the IDs, is generated using the difference between the information on the positions of the obstacles, which are present in the direction angles of the virtual sensors, and the information on the current position of the robot. In more detail, the IDs of the virtual sensors are generated using the difference between the direction angles of the virtual sensors and the current direction angle of the robot. Then, the information on the distances between the obstacles and the robot, the information, which is estimated to be generated by the virtual sensors, is generated using the difference between the information on the positions of cells having probability values greater than a threshold value among the cells having the updated probability values and the information on the current position of the robot.

Then, the movement of the robot is controlled according to the information on the positions of the obstacles. In other words, the movement of the robot is controlled from the information provided by the virtual sensors (operation 75). In more detail, the movement of the robot is controlled using methods such as a fuzzy rule-based control method, a neural network-based control method, or a proportional integral derivative (PID) control method, which corresponds to the sensor-based control method. Thereafter, the robot moves according to the control (operation 76), and the information on the current position of the robot according to the movement is generated (operation 77).

Figure 8:
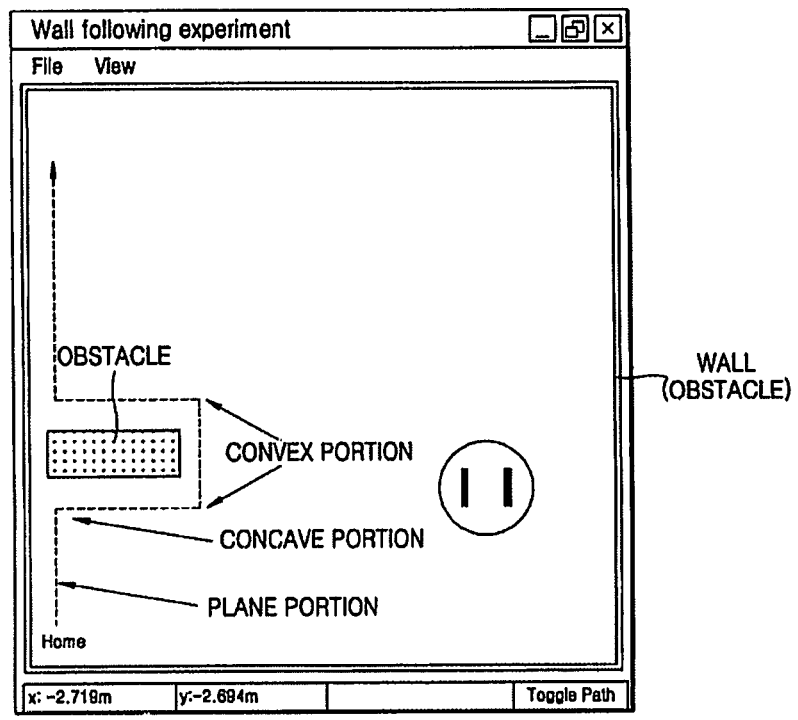
FIG. 8 illustrates a test environment for testing a performance of the robot of FIG. 1.

FIG. 8 illustrates a test environment for testing a performance of the robot of FIG. 1.

Referring to FIG. 8, a simulator is used to test the performance of the robot. The movement area of the robot is (−3, −3) to (3, 3) m². As shown, the test is performed to detect whether or not the robot can move along vertical surfaces, which include a plane portion, a concave portion and convex portion.

Figure 9:
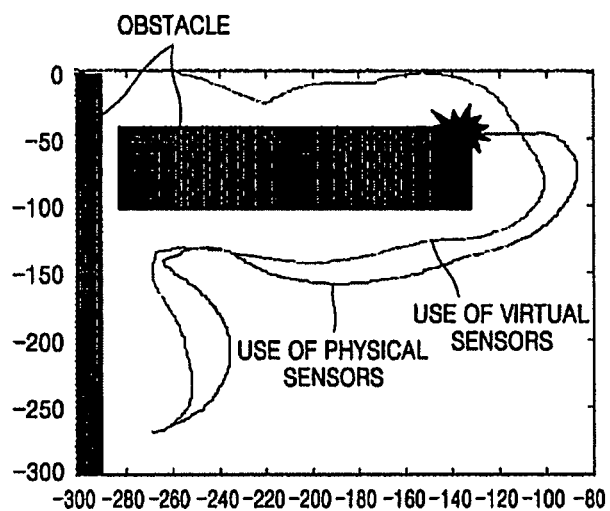
FIG. 9 illustrates a first test result in the test environment of FIG. 8.

FIG. 9 illustrates a first test result in the test environment of FIG. 8.

Referring to FIG. 9, a test is performed in such a state that the robot having three physical sensors is made to move spaced apart from the vertical surface by 40 cm. As a result of the test, due to the deficiency of the number of the sensors, the robot collides with the obstacles. Then, a test is performed in such a state that the present invention is applied to the robot having the three physical sensors, that is, the robots having seven virtual sensors is made to move spaced apart from the vertical surfaces by 40 cm. As a result of the test, the robot can avoid the obstacle using the information on the positions of the obstacle, which is generated from the seven virtual sensors.

Figure 10:
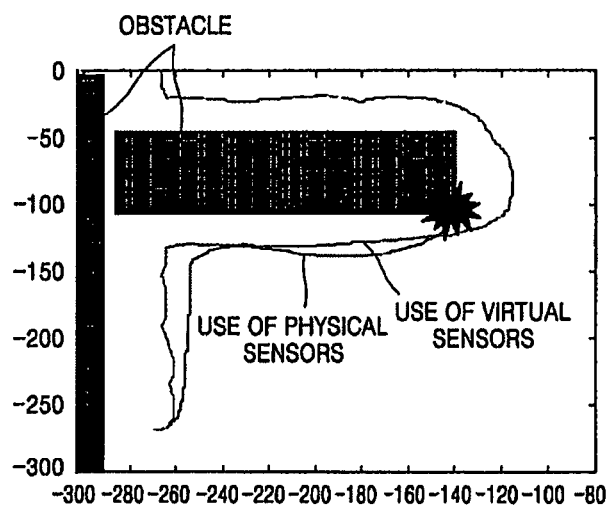
FIG. 10 illustrates a second test result in the test environment of FIG. 8.

FIG. 10 illustrates a second test result in the test environment of FIG. 8.

Referring to FIG. 10, a test is performed in such a state that the robot having five physical sensors is made to move apart from the wall by 35 cm. As a result of the test, although the number of the sensors increases by two, the robot does not avoid the obstacle and thus collides with it, due to the narrow distance between the walls. Then, a test is performed in such a state that the present invention is applied to the robot having the five physical sensors, that is, the robots having the seven virtual sensors is made to move spaced apart from the vertical surfaces by 35 cm. As a result of the test, the robot can avoid the obstacle using the information on the positions of the obstacle, which is generated from the seven virtual sensors.

According to an aspect of the present invention, it is possible to overcome the limit in the number and arrangement of the previously installed physical sensors by controlling the move of the robot based on the virtual sensors that are virtually present. Thus, the present invention has an effect that can improve the navigation performance of the physically-completed robot. Also, although the number and arrangement of the physical sensors are changed, the number and arrangement of the virtual sensors can be maintained constantly. Therefore, the control algorithm prior to the change can be used without any modification.

Further, since the detectable region of the virtual sensor can be set freely, robot system designers or users can navigate the robot to move close to the obstacle by any desired distance. Especially, the present invention can be applied to cleaner robot or the like, which has to move close to the obstacle.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A navigation method using a virtual sensor, comprising:
   (a) generating, by at least one processor, information on positions of obstacles, wherein the information includes information on positions of the obstacles generated by physical sensors and information being generated by virtual sensors that are virtually present at virtual positions, which have different direction angles from each other, based on the information on positions of the obstacles generated by physical sensors, which have different direction angles from the direction angles of at least one of the virtual sensors, and the direction angles of the virtual sensors; and
   (b) controlling a movement of a robot using at least one sensor-based control method to which the information generated by the virtual sensors is inputted as the information generated by the physical sensors and the information generated by the physical sensors,
   wherein both of the information generated by the virtual sensors and the information generated by the physical sensors, are the same type of information on positions of the obstacles, which represents distances between the obstacles and the robot at the direction angle of each of the physical sensors and the virtual sensors, and
   wherein information generated by one virtual sensor of the virtual sensors has only one value representing numerical distance between the obstacles and the robot at the direction angle of the one virtual sensor, the one value being the same type of information as information generated by one physical sensor of the physical sensors, and
   wherein at least one of the virtual sensors has a direction angle which is different from the direction angles of the physical sensors.

2. The navigation method of claim 1, wherein the generating information (a) generates information on distances between the obstacles and the robot, the information to be generated by the virtual sensors, using the difference between information on positions of obstacles, which are present in the direction angles of the virtual sensors, and information on a current position of the robot.

3. The navigation method of claim 1, wherein the at least one sensor-based control method is any one of a fuzzy rule-based control method, a neural network based control method, or a proportional integral derivative (PID) control method.

4. The navigation method of claim 1, wherein the process (a) comprises:
   (a1) generating IDs of the virtual sensors based on the direction angles of the virtual sensors and a current direction angle of the robot; and
   (a2) generating information on distances between obstacles and the robot, the information to be generated by the virtual sensors having the IDs, using difference between information on positions of obstacles that are present at the direction angles of the virtual sensors and information on a current position of the robot.

5. The navigation method of claim 1, further comprising (d) updating presence probability values of the obstacles, which are recorded on cells of a map representing a predetermined area, according to the information on the positions of the obstacles, which is generated by the physical sensors, wherein the process (a) generates information on distances between obstacles and the robot, the information to be generated by the virtual sensors, using the difference between information on positions of cells, which have probability values greater than a predetermined threshold value among the cells having the updated probability values, and information on a current position of the robot.

6. The navigation method of claim 5, wherein the process (a) comprises:
   (a1) generating IDs of the virtual sensors using the difference between the direction angles of the virtual sensors and a current direction angle of the robot; and
   (a2) generating information on distances between obstacles and the robot, the information to be generated by the virtual sensors having the IDs, using the difference between information on positions of cells, which have probability values greater than the predetermined threshold value among the cells having updated probability values, and the information on the current position of the robot.

7. The navigation method of claim 1, wherein for each physical sensor, there is a corresponding virtual sensor from among the plurality of virtual sensors, and wherein each corresponding virtual sensor and physical sensor have the same direction angle.

8. A navigation method using a virtual sensor, comprising:
(a) generating, by at least one processor, information on positions of obstacles, wherein the information includes information on positions of the obstacles generated by physical sensors and information being generated by virtual sensors that are virtually present at virtual positions, which have different direction angles from each other, based on the information on positions of the obstacles generated by physical sensors, which have different direction angles from the direction angles of at least one of the virtual sensors, and the direction angles of the virtual sensors;
(b) controlling a movement of a robot using at least one sensor-based control method to which the information generated by the virtual sensors is inputted as the information generated by the physical sensors and the information generated by the physical sensors,
(c) selecting one of a plurality of sensor arrangement types using a sensor arrangement type database, each of which has a different number of virtual sensors arranged differently from other sensor arrangement types,
wherein the generating information (a) generates the information generated by the virtual sensors having direction angles according to the selected sensor arrangement type,
wherein both of the information generated by the virtual sensors and the information generated by the physical sensors, are the same type of information on positions of the obstacles, which represents distances between the obstacles and the robot at the direction angle of each of the physical sensors and the virtual sensors, and
wherein information generated by one virtual sensor of the virtual sensors has only one value representing numerical distance between the obstacles and the robot at the direction angle of the one virtual sensor, the one value being the same type of information as information generated by one physical sensor of the physical sensors.

* * * * *

UNITED STATES PATENT AND TRADEMARK OFFICE
CERTIFICATE OF CORRECTION

PATENT NO. : 8,712,588 B2  
APPLICATION NO. : 11/060494  
DATED : April 29, 2014  
INVENTOR(S) : Myeong et al.

Page 1 of 1

It is certified that error appears in the above-identified patent and that said Letters Patent is hereby corrected as shown below:

On the Title Page Item [54] and in the Specification, Column 1, Line 1, delete "AND/OR" and insert -- AND --, therefor.

On the Title Page Item [56], Line 1, delete "Outodoor" and insert -- Outdoor --, therefor.

Signed and Sealed this
Twenty-ninth Day of July, 2014

Michelle K. Lee
*Deputy Director of the United States Patent and Trademark Office*